(12) United States Patent
Mills et al.

(10) Patent No.: US 7,836,015 B1
(45) Date of Patent: Nov. 16, 2010

(54) FAST SYNCHRONIZATION OF COMPUTER DATABASES USING COVERAGE STATUS

(75) Inventors: William Leonard Mills, Yacolt, WA (US); Tom Butler, Santa Clara, CA (US); Robert G. McKenzie, Aloha, OR (US)

(73) Assignee: Access Systems Americas, Inc., Sunnyvale, CA (US)

( * ) Notice: Subject to any disclaimer, the term of this patent is extended or adjusted under 35 U.S.C. 154(b) by 314 days.

(21) Appl. No.: 10/159,462

(22) Filed: May 31, 2002

Related U.S. Application Data

(60) Provisional application No. 60/377,713, filed on May 2, 2002.

(51) Int. Cl.
*G06F 7/00* (2006.01)
*G06F 17/00* (2006.01)

(52) U.S. Cl. .................. 707/613; 707/617; 707/618; 707/620

(58) Field of Classification Search .......... 707/201, 707/203
See application file for complete search history.

(56) References Cited

U.S. PATENT DOCUMENTS

| | | | | |
|---|---|---|---|---|
| 6,295,541 B1* | 9/2001 | Bodnar et al. | ............... | 707/203 |
| 6,401,104 B1* | 6/2002 | LaRue et al. | ............... | 707/203 |
| 6,449,622 B1* | 9/2002 | LaRue et al. | ............... | 707/201 |
| 2002/0059299 A1* | 5/2002 | Spaey | ............... | 707/104.1 |
| 2002/0116405 A1* | 8/2002 | Bodnar et al. | ............... | 707/202 |
| 2003/0182327 A1* | 9/2003 | Ramanujam et al. | ............... | 707/204 |

* cited by examiner

*Primary Examiner*—Cam Y T Truong
(74) *Attorney, Agent, or Firm*—Berry & Associates P.C.

(57) ABSTRACT

A method and system for fast synchronization of computer databases using coverage status. First coverage information of a first database and second coverage information of a second database are accessed. Using the coverage information from the two databases, it may be determined which data elements from the second database are more recent than corresponding data elements from the first database. Data elements from the second database that are more recent than corresponding data elements of the first database may be transferred to the first database. In this novel manner, synchronization of two databases may take place without comparing corresponding data elements between the two databases in order to determine if a data element has been modified. By this exchange of coverage information, it is possible to transfer only changed records, in one direction, allowing for a consistent synchronization method that is typically faster than prior art methods.

15 Claims, 5 Drawing Sheets

FAST SYNCHRONIZATION OF COMPUTER DATABASES USING COVERAGE STATUS

RELATED APPLICATION

This application claims the benefit of U.S. Provisional Application Ser. No. 60/377,713, filed May 2, 2002, entitled "System and Method for Synchronizing Computer Databases," which is hereby incorporated herein by reference in its entirety.

FIELD OF THE INVENTION

Embodiments of the present invention relate to database design. More particularly, embodiments of the present invention provide a method and apparatus for fast synchronization of computer databases using coverage status.

BACKGROUND ART

A database is generally a collection of related information stored in computer readable form. Databases are ubiquitous in modern life. Mobile phones often contain databases of recently and frequently called numbers. The world wide web is comprised of countless databases. Hand held computers are in large part valuable because of the databases they contain. In fact, the databases contained in most computers are far more valuable than the computer hardware itself.

In order to use this valuable information, people must have access to the information. This is frequently accomplished using different types of computers for different situations. For example, a salesman may create a spreadsheet containing pricing information on a desktop computer, and desire to access that information via a small hand held computer while at a customer's premises.

It is often difficult, expensive or impractical to actually access the same database from both types of computers, especially if one is operated in a mobile environment. To overcome this difficulty, a process of synchronizing databases was developed.

Synchronizing a database is generally a process by which a plurality of copies of a database are maintained such that the information in all copies is the same, or synchronized. The copies need not be bit for bit identical. A synchronization process can accommodate different file structure, operating system and data media requirements. The copies are frequently on different computer systems, but it is sometimes desirable to maintain separate, synchronized databases on the same computer system. Synchronization allows updates ("mutations") e.g., additions, deletions and/or changes made to one copy of a database, for example a copy on a hand held computer, to be reflected to all copies.

Unfortunately, synchronizing databases can be a time consuming process, especially for large databases and slow (low bandwidth), for example wireless, links between computers. Prior art synchronization systems often times require transferring all information of a database from one computer to another and performing a bit for bit comparison to determine changes. This is particularly the case when more than two synchronized copies of a database exist. As the memory capacity of computers grows, particularly hand held computers, and databases become ever larger, the time required to perform these operations is becoming a deterrent to users. Since the value of using multiple computers may depend on the ability to synchronize the data among them, impediments to synchronization serve to limit the productivity gains that may otherwise be realized.

Another prior art implementation of synchronization employs two different modes of synchronization, namely a slow "sync" mode and a fast "sync" mode. According to this implementation, a fast synchronization may only transfer information (data elements or records) which has changed since a prior synchronization between databases. However, fast synchronization may only be applicable in a limited number of situations, for example, during the first synchronization after a database has been modified. However, in a subsequent synchronization with a different (e.g., a third) database, a fast sync is not appropriate and a slow sync as described above, comparing each record in a database, is required. Although some prior art systems provide some general fast synchronization capabilities, no existing prior art systems provide for "fast" synchronization among nodes in arbitrary looped topologies.

Another shortcoming of the two-mode data synchronization approach, where fast sync is used in some cases and slow sync in others, is that it necessitates extra programming effort. In particular, since different sync modes are needed under different scenarios, developers need to incorporate program code in synchronization programs for determining which sync mode to use in a given situation, and then implement both synchronization modes. Such a requirement is undesirable because the extra program code could prolong the development cycle and introduce added complexity to the applications. Thus, it would be beneficial to provide an approach for data synchronization which is efficient in terms of speed and which does not employ multiple modes of synchronization depending on the particular situation.

SUMMARY OF THE INVENTION

Accordingly, it would be advantageous to provide a method and system for fast synchronization of computer databases using coverage status. A further need exists for a single synchronization method that is able to synchronize multiple databases. A still further need exists for a method of maintaining coverage status of a database.

Embodiments of the present invention provide a method and system for fast synchronization of computer databases using coverage status. Further embodiments of the present invention provide a single synchronization method that is able to synchronize multiple databases. Still further embodiments of the present invention provide a method of maintaining coverage status of a database.

More specifically, a method and system for fast synchronization of computer databases using coverage status are disclosed. First coverage information of a first database and second coverage information of a second database are accessed. The databases may be maintained on separate computer systems. The coverage information may be accessed by a single synchronization program operating on a single computer system. Using the coverage information from the two databases, it may be determined which data elements from the second database are more recent than corresponding data elements from the first database. Data elements from the second database which are more recent than corresponding data elements of the first database may be transferred to the first database. In this novel manner, synchronization of two databases may take place without comparing each data element from one database with a corresponding data element from another database in order to determine if a data element has been modified. By this exchange of coverage information, it is possible to advantageously transfer only changed records, in one direction, allowing for a consistent synchronization method that is typically faster than prior art methods.

DETAILED DESCRIPTION OF THE INVENTION

Figure 1:
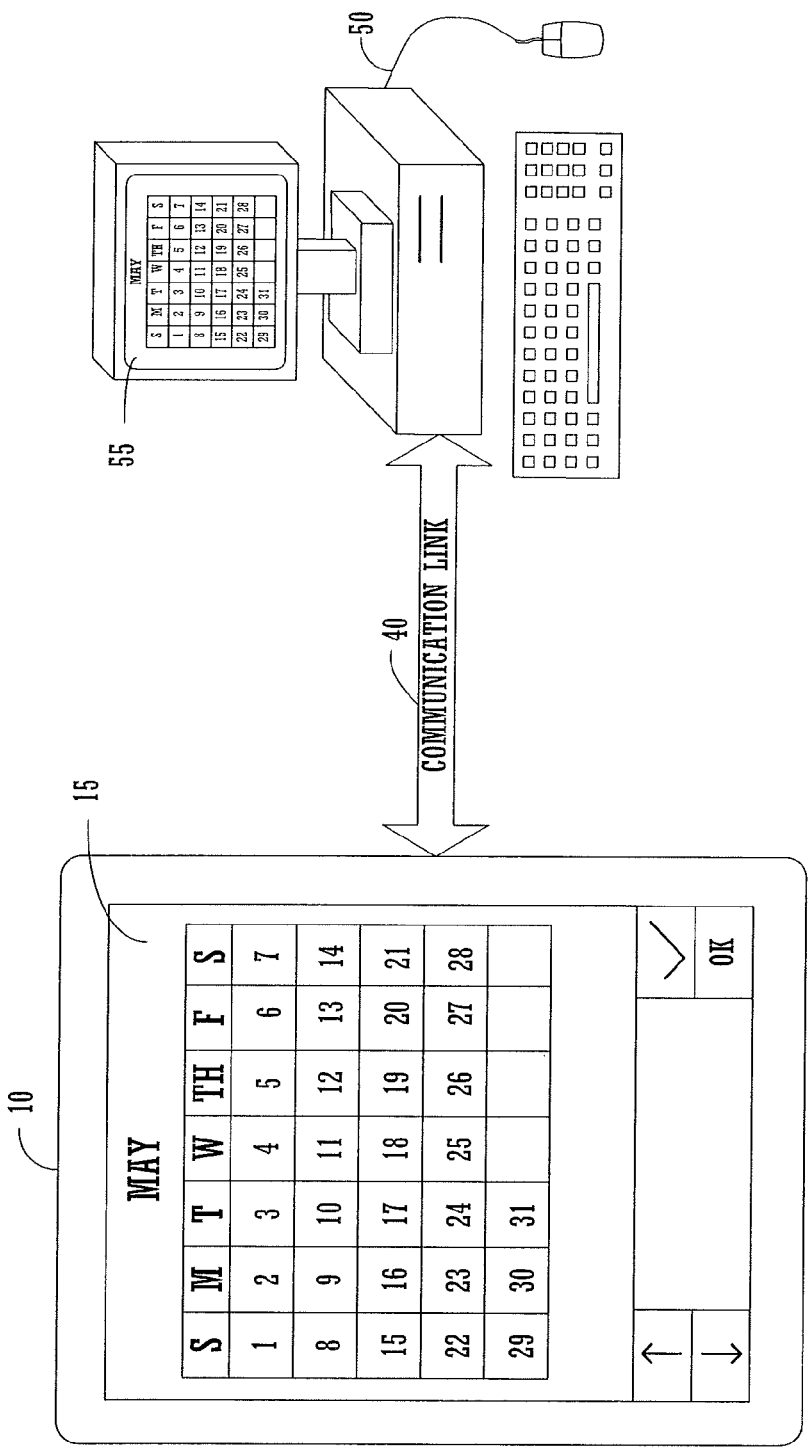
FIG. 1 illustrates a hand held computer system and a desktop computer that maintain synchronized databases, according to an embodiment of the present invention.

In the following detailed description of the present invention, fast synchronization of computer databases using coverage status, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

NOTATION AND NOMENCLATURE

Some portions of the detailed descriptions which follow (e.g., processes 300 and 400) are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "indexing" or "processing" or "computing" or "translating" or "calculating" or "determining" or "scrolling" or "displaying" or "recognizing" or "generating" or "demarking" or "transferring" or "accessing" or "determining" or "maintaining" or "replacing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Fast Synchronization of Computer Databases Using Coverage Status

U.S. Pat. No. 6,000,000, issued on Dec. 7, 1999 entitled "Extendible Method and Apparatus for Synchronizing Multiple Files on Two Different Computer Systems" and assigned to the assignee of the present invention is hereby incorporated herein by reference in its entirety as background.

Co-pending commonly-owned U.S. patent application Ser. No. 09/710,605, filed Nov. 10, 2000, entitled "Optimized Database Technique to Enable Faster Data Synchronization" to McCaw is incorporated herein by reference in its entirety.

Embodiments of the present invention are described in the context of a hand held computer system interacting with a desk top computer. However, it is appreciated that the present invention may be utilized in other types of computer systems, including single or distributed computer systems where it may be necessary or desirable to synchronize the contents of computer readable information.

FIG. 1 illustrates a hand held computer system 10 and a desktop computer 50 that maintain synchronized databases, according to an embodiment of the present invention. It is appreciated that a wide variety of databases, resident on a variety of types of computer systems with various interconnections are well suited to embodiments of the present invention. Further, the synchronization of databases within the same computer is well suited to embodiments of the present invention.

Hand held computer system 10 is connected to desktop computer 50 through a communication link 40. Communication link 40 is often an asynchronous serial data link, for example RS-232. However, numerous wired and wireless communication links, including for example, infrared light, Bluetooth, IEEE 802.11 and universal serial bus (USB) are well suited to embodiments of the present invention. Communication link 40 allows the two computer systems to transfer information. In the example of FIG. 1, hand held computer system 10 is running a calendar (or date book) application program 15 and the desk top computer system 15 is running a complimentary calendar program 55. It is desirable for information entered into one program on one computer system, for example into calendar program 15 running on hand held computer 10, to be shared with another complimentary calendar program, for example calendar program 55 running on desk top computer system 50.

Synchronization is generally a process by which a plurality of copies of a database are maintained such that the information in all copies is the same, or synchronized. The copies need not be bit for bit identical. A synchronization process can accommodate different file structure, operating system and data media requirements. The copies are frequently on different computer systems, but it is sometimes desirable to maintain separate, synchronized databases on the same computer system. Synchronization allows, for example, additions, deletions and/or changes made to one copy of a database (also known as mutations), for example a copy on a hand held computer, to be reflected to all copies.

These database copies are generally known as "endpoints." In some literature the terms "farpoint" or "node" are used synonymously. At other times, the term "node" may be used to describe an entity, for example a computer system, comprising multiple endpoints. An endpoint is generally a source or destination of records (individual data items) to be synchronized. For example, it is commonplace to synchronize a desktop calendar system database with a calendar database on a hand held computer. In this example, the calendar database on the desktop computer is an endpoint, and the handheld calendar database is another endpoint. Endpoints are generally data structures in permanent, or semi-permanent computer memory, such as battery powered RAM in a hand held computer or magnetic media within a desktop computer. Endpoints may, however, be temporary, for example a buffer in a wireless data protocol stack.

Further, synchronizing data between two endpoints is a complex task. A prior art conduit program determines if a difference exists between corresponding records at each endpoint. In some cases, a record on a first endpoint may be marked with a "dirty bit" to identify that it has been changed since the last synchronization with a second endpoint. If the dirty bit is cleared after synchronization with a second endpoint, and the first endpoint is subsequently synchronized with a third endpoint, another method of identifying differences between endpoints must be utilized to detect differences between the first and third endpoints. As a result, in general prior art conduit programs must implement multiple methods of identifying and resolving data differences between their two endpoints.

A "pedigree" is generally a record of change(s) of a database object, and may be used to indicate if an object has changed since a synchronization session. Co-pending, commonly owned, application Ser. No. 10/159,461, filed May 31, 2002, discloses a novel pedigree system that is well suited to embodiments of the present invention, and is hereby incorporated herein by reference in its entirety. It is to be appreciated that embodiments of the present invention are well suited to pedigrees and methods of creating and updating pedigrees other than those described herein and in the aforementioned patent application.

A "synchronization clock" or "sync clock" may be used to establish a pedigree of a data record or data atom. According to an embodiment of the present invention, a sync clock may be a positive integer value that increases monotonically with each synchronization action. It is to be appreciated that a synchronization clock and its count need have no relation to actual time. A synchronization clock may be viewed as a label for a period of time between synchronizations.

A sync clock may be maintained for an individual database or node. Such individual sync clocks may be useful when databases are synchronized within a computer device or when all databases are not synchronized at the same time. A single sync clock may also be maintained by and for a single computer system. A sync clock may be advanced at each synchronization (unless no changes have occurred since a prior synchronization).

Using sync clocks, a pedigree may be created by combining a sync clock count and a node identifier. This information is then associated with a data record when the data record is created or modified. For example, a desk top computer may use the letter "D" as an identifier. When a database record, e.g., an appointment is created, the sync clock may have a value of "001." Consequently, the database record may be assigned a pedigree of "D001" to indicate that the record was created on the desk top computer "D" while the desk top computer's sync clock count was 001.

As another example, assume that the desk top computer synchronizes with Tom's hand held computer, receiving a copy of the exemplary appointment data record in the process. A change to this record performed on the hand held computer may append the hand held computer's identification and current sync clock count to a previous set of pedigree information. Thus, the pedigree for the now modified data record might be "D001T001," where the "T001" portion represents an identifier for Tom's hand held computer "T" and the hand held computer's sync clock count at the time of the modification. It is to be appreciated that many methods of combining clocks and identifiers with previous pedigree information, including appending, prepending and mathematical combinations, are well suited to embodiments of the present invention.

"Coverage status" or "coverage" describes the level of information contained within a database or device. Coverage forms a type of pedigree for an entire body of information, e.g., a database. Coverage may also be created from a sync clock and device or database identification information. Building on the previous examples, after a complete synchronization, both the desk top computer and the hand held computer share identical copies of the synchronized information. Under such conditions, the coverage of the two devices may be said to be the same. That coverage may be represented as "D001T001," where "D001" represents the identifier for the desk top computer and its sync clock at the time of the synchronization, and "T001" represent the same information for the hand held computer. It is to be appreciated that while the coverage and pedigree of a data record in this example are identical, coverage and pedigree represent different information and in general will not be identical.

Figure 2:
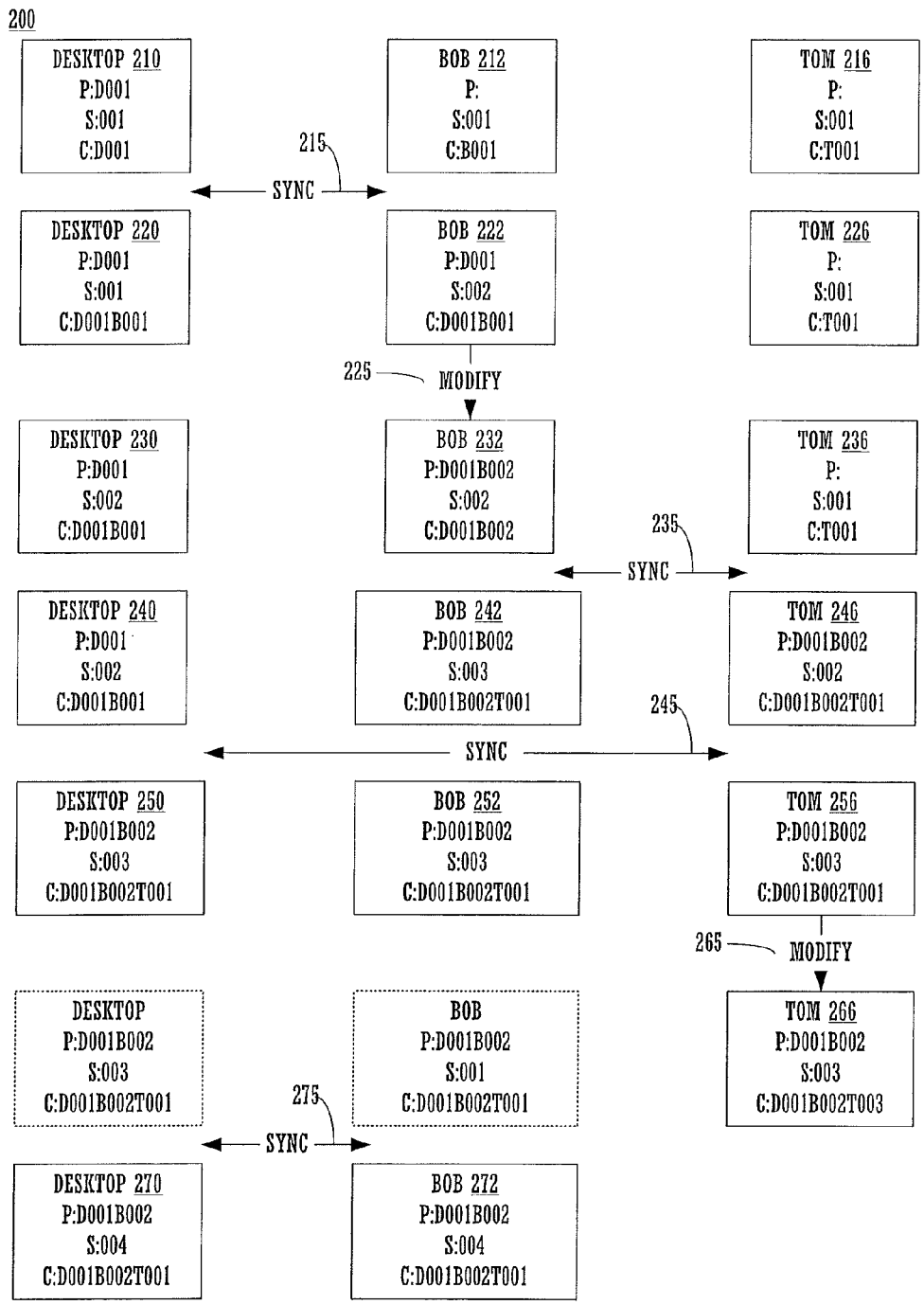
FIG. 2 shows a sequence of partial state information illustrating exemplary synchronization clocks, pedigrees of a data record and coverage status among three computer systems, according to an embodiment of the present invention.

FIG. 2 shows a sequence of partial state information 200, illustrating exemplary synchronization clocks, pedigrees of a data record and coverage status among three computer systems, according to an embodiment of the present invention. A general time axis extends from top to bottom of FIG. 2. However no time scale is presented or implied.

The initial state of a desktop computer 210 has a sync clock identified by the label "S:" of "001." Likewise, the initial state of Bob's hand held computer 212 has a sync clock of 001, and the initial state of Tom's hand held computer 216 has a sync clock of 001. Since, in this example, none of the computers have synchronized with one another, their coverage, indicated by "C:" is limited to data contained within each system. Consequently, the coverage of the desk top computer is D (to identify it as the desktop) 001. In a similar fashion, the coverage of Bob's hand held computer is B001 and Tom's hand held indicates coverage of T001.

If a data record, for example an appointment, is created on the desk top computer, the record is assigned a pedigree "P:" of D001, comprising the identifier "D" for desk top and "001" for the current state of the sync clock.

The desk top computer and Bob's hand held computer participate in a synchronization operation 215. After synchronization operation 215 is complete, the desk top still contains the appointment record with pedigree D001. In desk top state 220 the desk top sync clock is incremented to 002. The desk top coverage has been updated to "D001B001." This updated coverage indicates that the desk top now contains information that is current to the level of D001 and information that is current to the level of B001 which was the coverage status of Bob's hand held computer prior to synchronization operation 215.

Bob's hand held state 222 is updated to include coverage status "D001B001," indicating that state 222 now contains information that is current to the level of B001 and information that is current to the level of D001 which was the coverage status of the desk top computer prior to synchronization operation 215. Correspondingly, Bob's hand held computer now contains a copy of the appointment record (pedigree D001). Responsive to synchronization operation 215, Bob's sync clock has been incremented (002). Tom's hand held computer state 226 remains the same as state 216 as no synchronization or modification activity has taken place.

In modification action 225, the appointment record is modified on Bob's hand held computer, for example to add meeting room information to the record. This is shown in state 232. Consequently, the pedigree for the record is updated to contain an identifier for Bob's hand held ("B") and the current sync clock ("002"). Within state 232, the sync clock remains "002." Note that the coverage ("D001B002") has been updated to reflect an update that occurred while the sync clock was 002, signified by "B002"). Desk top state 230 remains the same as desk top state 220 and Tom's hand held state 236 is the same as Tom's hand held state 226. It is to be appreciated that all local record coverages implicitly contain the current value of the local node's synchronization clock. Local record pedigrees generally do not contain the current value of the local synchronization clock.

In synchronization action 235, Bob and Tom synchronize their hand held computers. In Bob's hand held computer state 242, the sync clock has been incremented ("003") to reflect the occurrence of a synchronization action (235). The data record pedigree remains the same. The coverage is updated to reflect information from Tom's hand held. The "T001" portion of the coverage indicates that Bob's hand held now contains information current to Tom's hand held computer at a sync clock of 001. Desk top state 240 remains the same as desk top state 230.

In a similar fashion, Tom's hand held computer state 246 is also updated. Tom's hand held now contains a copy of the (once-modified) appointment record and its pedigree. Tom's hand held sync clock is incremented to reflect the synchronization action (235), and Tom's hand held coverage is updated. Tom's hand held coverage indicates that, in addition to information present in state 236, Tom's hand held now includes information from Bob's hand held state 232 (the "B002" portion) and information from the desk top computer's state 210 ("D001").

In synchronization action 245, Tom's hand held computer synchronizes with the desk top computer (Bob's hand held computer is not involved in synchronization action 245). After synchronization action 245, the modified appointment record with pedigree "D001B002" has been transferred to the desk top computer, as shown in desk top computer state 250. Also shown in state 250 is the updated sync clock ("003"). In state 250, the desk top computer also has updated coverage "D001B002T001," indicating that the level of information in the desk top computer is equivalent to the level of information in Tom's hand held computer for sync clock 002. Further, it is appreciated that the updated coverage information of state 250 indicates that the level of information in the desk top computer is also equivalent to the level of information in Bob's hand held at sync clock B002, even though the desk top computer and Bob's hand held computer have not directly synchronized since the appointment record was modified.

Likewise, state 256 shows that Tom's hand held computer has updated its sync clock and has the same coverage as the desktop computer. The state of Bob's hand held computer 252 is unchanged from state 242.

In modification action 265, another calendar record is modified on Tom's hand held computer. Note that this is not the record discussed previously. State 266 shows that the pedigree of the previous record is unchanged, since it was not affected by modification action 265. Further, since no synchronization occurred between state 256 and state 266, the sync clock value on Tom's hand held computer remains unchanged. However, since a change did occur (to a calendar record), the coverage of Tom's hand held computer is updated. The new value, "D001B002T003" indicates that a change, and in this case the most recent change, was made to the information in the calendar database while Tom's hand held sync clock was 003.

In order to perform "fast" synchronization, it is desirable to transfer only information that is "new" to a recipient. It is further desirable to minimize the amount of information that is transferred or exchanged in order to determine what information is new to a recipient. The use of coverage status in accordance with the present invention allows a sender and receiver to efficiently determine what new information may exist, and to transfer only that new information.

Still referring to FIG. 2, in synchronization action 275, Bob's hand held synchronizes with the desktop computer. As a first step of synchronization, the two computers exchange coverage information. It is appreciated that the two computers may send coverage information to a central synchronization manager, according to an embodiment of the present invention.

The coverage of the desktop shown in state 250, and the coverage of Bob's hand held computer shown in state 252 are the same. Since no modifications have occurred to the data on either system, their coverages are the same immediately prior to synchronization event 275.

Bob's computer compares its coverage ("D001B002T001") with the coverage provided by the desktop (or a central synchronization manager for the desktop). Since the desktop coverage indicates that Tom's hand held can gain nothing new from the desktop, e.g., desktop coverage does not exceed Tom's coverage, no new information needs to be sent to Tom's hand held. Further, in this example, since Tom's hand held coverage does not exceed the desktop's coverage, no new information needs to be sent to the desktop. Consequently, aside from coverage information, no data elements were transferred in either direction, resulting in a "fast" synchronization between the two computers.

For example, prior to the transfer of any data elements, Bob's computer is able to determine that the desktop computer has seen the most recent modification (of which Bob is aware) to the data record (made in modification action 225), even though Bob's hand held and the desktop have not synchronized since synchronization action 215. By the exchange of coverage information, the two computers are able to determine that they both have received information, which was created and/or modified, since they last synchronized. Thus it may be seen that coverage enables fast synchronization in a general loop topology, according to an embodiment of the present invention.

State information 270 shows that the data record remains unchanged (has the same pedigree) on the desktop, and that the desktop synchronization clock has been incremented to reflect its participation in synchronization session 275. Likewise, state information 272 shows that the data record remains unchanged (has the same pedigree) on Tom's hand held, and that the synchronization clock for Tom's hand held has been incremented to reflect its participation in synchronization session 275. It is to be appreciated that a synchronization clock may be updated when a data element is modified subsequent to a synchronization event, according to an embodiment of the present invention.

Each data node can maintain a coverage status or coverage for each data set for which it syncs. The coverage is a set of sync clocks associated with the data set. The coverage means that the set of data atoms (typically records in a database) retained by the node includes, or has priority over, all data atoms with mutations occurring on or before the status clocks.

For example, if the coverage's clocks are A:7, B:17, C:13 (sync clocks A, B, and C are at 7, 17, and 13 respectively) then the data set includes all mutations from source A that occurred at 7 or earlier, all from source B that occurred at 17 or earlier and all from source C that occurred at 13 or earlier.

A recipient node can inform a sending node of its coverage status. This allows the sending node to filter out data atoms already seen by the recipient, resulting in a minimum transfer of information records, or fast sync. The sending node should also send its own coverage status. In general, a recipient will not be able to determine its new coverage status from record pedigrees alone. Rather, a recipient should update its coverage status to reflect the coverage status of the sending node.

For example if the recipient has coverage status A:7, B:17, C:13 and the sender has coverage status A:4, B:19, D:82 then the sender should send any mutations with time stamps greater than B:17 or D:0. These are the mutations the recipient has not seen. Upon receiving this information the recipient node can then update its coverage status to A:7, B:19, C:13, D:82.

Synchronizing only a portion of a database, which will be discussed in more detail below, illustrates one reason that a coverage status should be sent to a recipient database. For example, if a recipient node is not allowed to receive some information from database D, e.g., for security reasons, a sender may not send, and the recipient should not receive all of the content of database D. For example, the recipient may not receive a data record with a pedigree more recent than D:40. Consequently, the recipient may not be able to determine its coverage status through examination of the pedigrees of data atoms in its version of the D database. However, with the information that the recipient's coverage is D:82, the recipient would not have to subsequently receive (or attempt to receive) information from a sender with D coverage between 41 and 82.

Incomplete synchronization, for example a synchronization which has been interrupted for some reason (e.g., taking a hand held out of a cradle, loss of wireless connectivity, etc.) further illustrates that a coverage status should be sent to a recipient database, preferably at the end of a synchronization session. For example, a sender has records in database D with pedigrees D:50, D:54, D:79 and D:82. If communication between the sender and a recipient node is interrupted after a D:82 record is transferred, but prior to the D:50 record, a recipient might assume that its new coverage was at least D:82, since it has such a record. At a subsequent synchronization, the recipient would state its coverage and, in error, not receive the D:50, D:54 and D:79 records. In this case, the actual coverage of the recipient should not change, even though it received some newer records. By use of a synchronization method that requires a statement of sync coverage, this error condition may be avoided.

It is appreciated that in a one way synchronization from sender to recipient, the sender (e.g., a sending database) need not change anything. A recipient may update its information based on information from a sender. A sender's coverage is not changed. Only a recipient updates its coverage.

There may be some circumstances, for example bandwidth-optimized wireless refresh, in which a recipient has no opportunity to first communicate its current coverage. In this case, a sender must presume the recipient's coverage status based on its most recently communicated coverage status. For example, a handheld computer's changes are synced to a desktop via a wired cradle. The desktop later syncs to a server. If the handheld later syncs wirelessly to the server, it may redundantly send its changes to the server unless there is an extra round of transmission in which the server gives its coverage status.

Figure 3:
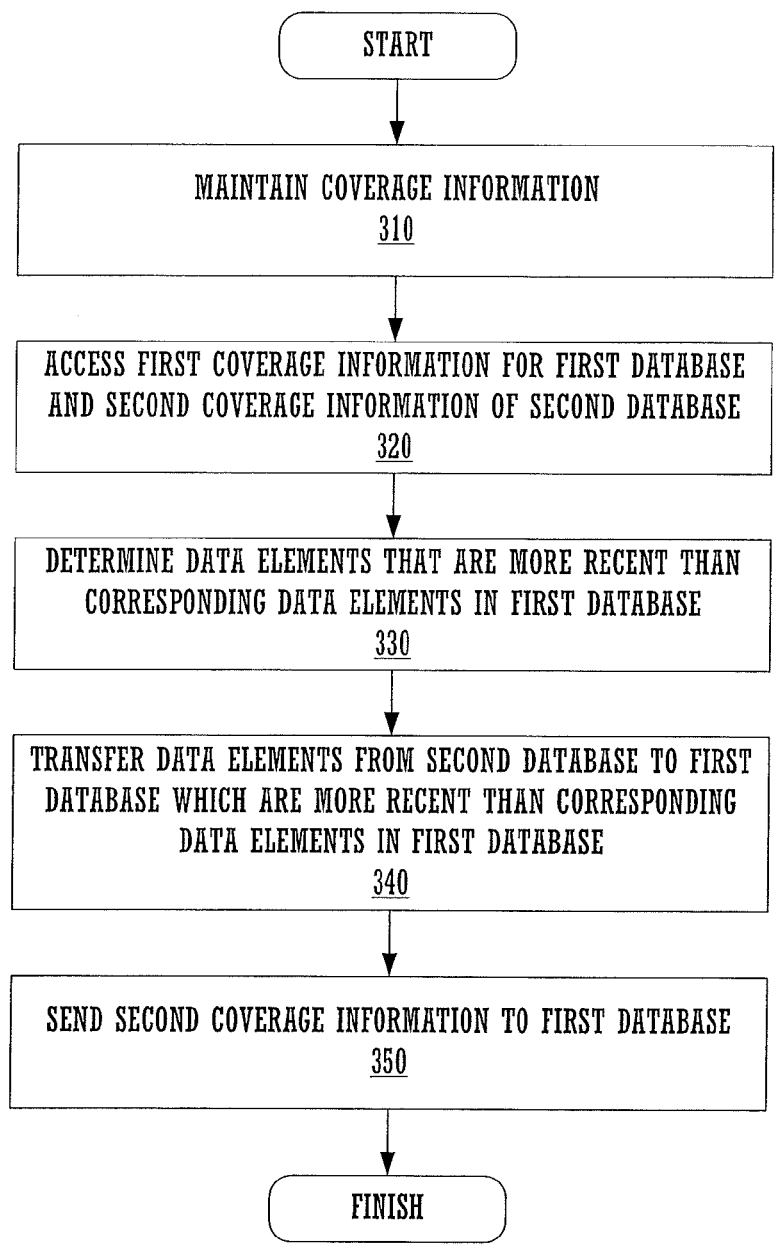
FIG. 3 is a flow chart that illustrates a computer implemented method of synchronizing databases, according to an embodiment of the present invention.

FIG. 3 is a flow chart that illustrates a computer implemented method 300 of synchronizing databases, according to an embodiment of the present invention.

In optional step 310, coverage information may be maintained for a plurality of databases. The coverage information generally describes a level, or condition of information in the database.

In step 320, first coverage information of a first database and second coverage information of a second database is accessed. Coverage information may be accessed, for example, by a single synchronization program running on a computer. There may be many databases involved in a single synchronization, and coverage information from some or all may be accessed.

In optional step 330, data elements that are more recent than corresponding data elements in the first database may be determined. A comparison of coverage information may indicate criteria for which data elements are more recent. For example, assume that the second database has a coverage of "D:82" and that the first database has a coverage of "D:40." A comparison of the two coverages indicates that data elements with a pedigree including a component greater than D:40 is more recent than any corresponding data element contained within the first database.

In step 340, data elements from the second database that are more recent than corresponding data elements in the first database are transferred to the first database.

In optional step 350, the coverage information of the second database is transferred to the first database.

In this novel manner, the information which is transferred in order to synchronize two or more databases may be identified and limited to only that which is necessary. Further, coverage information of a database allows databases to determine if synchronization is necessary, and the direction(s) of a synchronization transfer, prior to transferring any record-level data of a database.

Figure 4:
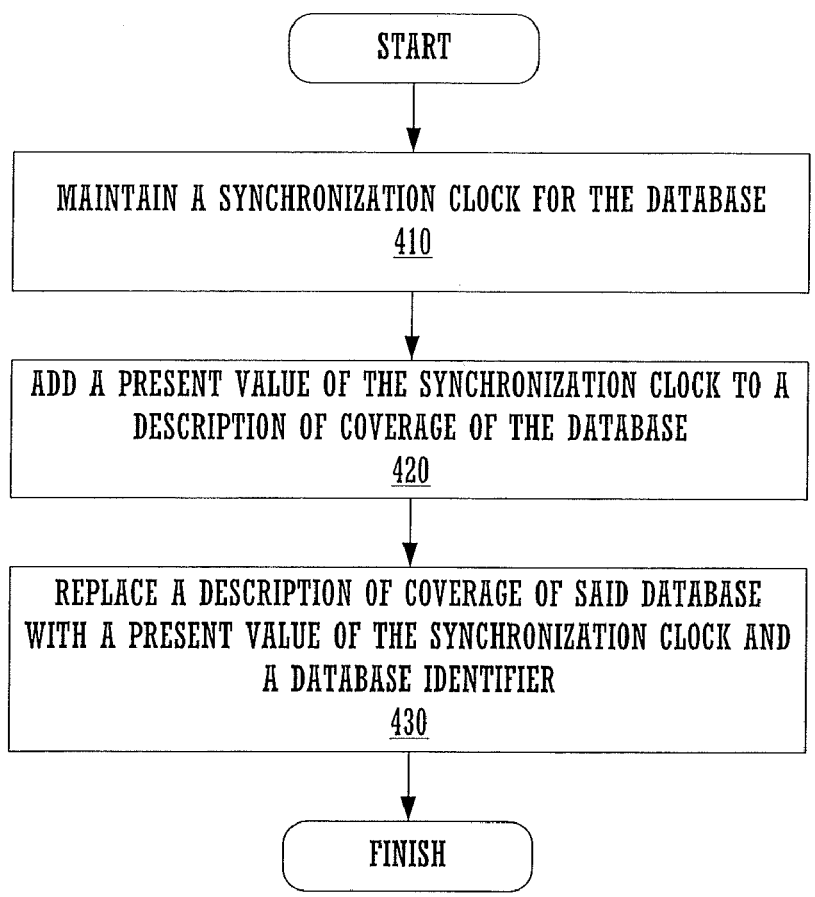
FIG. 4 is a flow chart that illustrates a computer implemented method of indicating coverage of a database, according to an embodiment of the present invention.

FIG. 4 is a flow chart that illustrates a computer implemented method 400 of indicating coverage of a database, according to an embodiment of the present invention.

In step 410, a synchronization clock is maintained for the database. The synchronization clock may be unique to the database, or multiple databases may utilize a single synchronization clock. According to an embodiment of the present invention, the synchronization clock may be a monotonic sequence of symbols, for example a count of integers which only increases. As described previously, a synchronization clock should be advanced to the next symbol, e.g., to the next number, when the database is synchronized.

In step 420, the present value of the synchronization clock is added to a description of coverage of the database in response to a change to a data element of the database. For example, if record number 27 of database D is modified while the D synchronization clock is at 81, then "D:81" may be added to the coverage of database D. It is appreciated that the pedigree of record 27 may also be updated using the synchronization clock to reflect the modification.

In optional step 430, a description of coverage of the database may be replaced with a present value of the synchronization clock and a database identifier. For example, building upon the previous example, prior to the modification of record 27, the coverage of database D may have been "T20B36D80." Step 420 above may have modified the coverage to produce "T20B36D80D81." The present step may replace a previous coverage of the database (D) with the present value of the synchronization clock and database identifier. This may simplify the new coverage to "T20B36D81" as the replaced value may be redundant. Including this step in a method may improve the storage and transmission requirements associate with database coverage.

Figure 5:
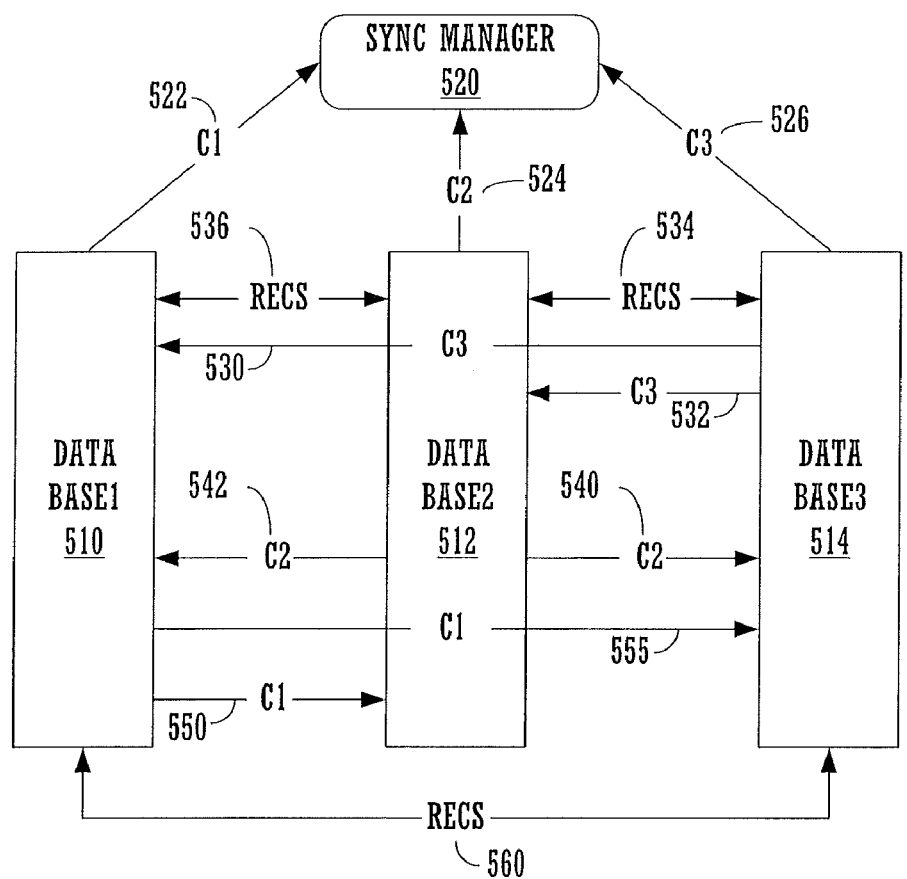
FIG. 5 is a data flow diagram depicting the movement of database information and coverage information, according to an embodiment of the present invention.

FIG. 5 is a data flow diagram depicting the movement of database information and coverage information, according to an embodiment of the present invention. In order to more clearly illustrate the data transfers, synchronization agents are not pictured. It is to be appreciated that in actual practice, communication between a database and another entity, for example another database or a common synchronization manager, is facilitated through a synchronization agent associated with each database.

Coverage information from databases participating in a synchronization is sent to a common synchronization manager 520. Coverage information 522 is sent from database 510 to common synchronization manager 520. Likewise, coverage information 524 is sent from database 512 to common synchronization manager 520 and coverage information 526 is sent from database 514 to common synchronization manager 520.

Based upon the coverage information, common synchronization manager 520 determines a maximum coverage available from the databases present, and records from databases needing to be transferred to bring all databases to the maximum coverage. In a general case, some records will need to be retrieved from all databases and sent to all databases. For example, all databases have location modifications to records which are unknown to the other databases.

Information transfer 536 shows records being transferred between database 510 and database 512. Information transfer 534 shows records being transferred between database 514 and database 512. Information transfer 560 shows records being transferred between database 510 and database 514.

In accordance with an embodiment of the present invention, the coverage information of each database may be updated subsequent to a transfer of data records. Coverage information 530 is sent from database 514 to database 510. Coverage information 532 is sent from database 514 to database 512. Coverage information 550 is sent from database 510 to database 512. Coverage information is sent from database 510 to database 514 via information transfer 560. Coverage information 542 is sent from database 512 to database 510. Coverage information 540 is sent from database 512 to database 514 and coverage information 555 is sent from database 512 to database 514. It is to be appreciated that FIG. 5 may not depict the actual routing of data, but rather the source and destination of information, according to an embodiment of the present invention.

The preferred embodiment of the present invention, fast synchronization of computer databases using coverage status, is thus described. While the present invention has been described in particular embodiments, it should be appreciated that the present invention should not be construed as limited by such embodiments, but rather construed according to the below claims.

What is claimed is:

1. A method of synchronizing first, second, through Nth computer databases using coverage information where a reference to Nth represents an integer, the method comprising the steps of:

transferring, by using a computer, said coverage information from said first, second, through Nth computer databases to a synchronization manager, where the Nth is an integer;

in a single operation, based on said coverage information and data entry pedigree information of said first, second, through Nth computer databases, determining any identified records to be transferred among said first, second, through Nth computer databases, wherein the coverage information comprise identifiers of said first, second, through Nth computer databases synchronized and synchronization counters of said first, second, through Nth computer databases;

directly transferring said identified records among said first, second, through Nth computer databases for synchronization;

maintaining a record of synchronization coverage to avoid synchronization errors;

after a successful synchronization operation is completed, updating the coverage information for specific ones of said first, second, through Nth computer databases that were involved in the synchronization operation;

updating a synchronization count and coverage status of the specific ones of said first, second, through Nth computer databases after each time data in said specific ones of said first, second, through Nth computer databases is modified and databases participate in the successful synchronization operation; and only updating coverage information clocks of the first, second, through Nth computer databases and counters of the first, second, through Nth computer databases after a successful synchronization is completed to prevent false coverage; and transferring the coverage information among said first, second, through Nth computer databases involved in the successful synchronization operation so that each database is aware of coverage information of other database involved in the synchronization operation.

2. The method as described in claim 1 wherein coverage information of a specific one of said first, second, through Nth computer databases comprises an identifier of said database and a synchronization count of said database.

3. The method as described in claim 1, wherein said first, second, through Nth computer databases not only maintain their own coverage status, but also maintain the coverage status of all said databases involved in a synchronization operation.

4. The method as described in claim 3, wherein said synchronization operation is one way, where only one of said first, second, through Nth computer databases receives information.

5. The method as described in claim 1 wherein the synchronization operation is only a partial synchronization.

6. The method of synchronizing databases as described in claim 1, wherein said determining step comprises the step of comparing all pairs of coverage information.

7. The method of synchronizing databases as described in claim 1, further comprising the step of:

maintaining coverage information for said databases.

8. The method of synchronizing databases as described in claim 1, wherein said coverage information comprises an element of a monotonic sequence of symbols identifying database identifier and synchronization count of all accounted for databases.

9. The method of synchronizing databases as described in claim 1, further comprising the step of: updating said coverage information for at least one of receiving databases, based on said coverage information of at least one of sending databases.

10. A computer system for synchronizing databases using coverage information, the computer system comprising:

a memory; a first computer system;

a plurality of first, second, through Nth computer databases coupled to said first computer system;

wherein said first computer system implements a method of synchronizing the databases, said method comprising the steps of:

transferring said coverage information from said first, second, through Nth computer databases to a synchronization manager, wherein the Nth is an integer;

in a single operation, based on said coverage information and data entry pedigree information of said first, second, through Nth computer databases, determining any identified records to be transferred among said first, second, through Nth computer databases, wherein the coverage information comprise identifiers of said first, second, through Nth computer databases synchronized and synchronization counters of said first, second, through Nth computer databases;

directly transferring said identified records among said first, second, through Nth computer databases for synchronization;

maintaining a record of synchronization coverage to avoid synchronization errors;

after a successful synchronization operation is completed, updating the coverage information for specific ones of said first, second, through Nth computer databases that were involved in the synchronization operation;

updating a synchronization count and coverage status of the specific ones of said first, second, through Nth computer databases after each time data in said specific ones of said first, second, through Nth computer databases is modified and databases participate in the successful synchronization operation; and only updating coverage information clocks of the first, second, through Nth computer databases and counters of the first, second, through Nth computer databases after a successful synchronization is completed to prevent false coverage; and transferring the coverage information among said first, second, through Nth computer databases involved in the successful synchronization operation so that each database is aware of the coverage information of other database involved in the synchronization operation.

11. The computer system as described in claim 10, wherein said determining step performed by the first computer system comprises the step of: comparing first coverage information and said second coverage information.

12. The computer system as described in claim 10, wherein said method further comprises the step of: maintaining coverage information for said first computer database and said second computer database.

13. The computer system as described in claim 10 wherein said coverage information comprises an element of a monotonic sequence of symbols.

14. The computer system as described in claim 10, wherein the step of transferring in said method further comprises the step of: updating first coverage information based on second coverage information.

15. The computer system as described in claim 10, wherein at least one of said plurality of databases is maintained on a second computer system.

\* \* \* \* \*